United States Patent
Xie et al.

(10) Patent No.: US 11,913,915 B2
(45) Date of Patent: Feb. 27, 2024

(54) UNIAXIAL BIDIRECTIONAL SYNCHRONOUS CONTROL ELECTROMAGNETIC LOADED DYNAMIC SHEAR TEST SYSTEM AND METHOD

(71) Applicant: SHENZHEN UNIVERSITY, Guangdong (CN)

(72) Inventors: Heping Xie, Guangdong (CN); Jianbo Zhu, Guangdong (CN); Tao Zhou, Guangdong (CN); Mingzhong Gao, Guangdong (CN); Cunbao Li, Guangdong (CN); Zhiyi Liao, Guangdong (CN); Kai Zhang, Guangdong (CN); Jun Wang, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 311 days.

(21) Appl. No.: 17/568,612

(22) Filed: Jan. 4, 2022

(65) Prior Publication Data
US 2022/0128443 A1 Apr. 28, 2022

Related U.S. Application Data

(63) Continuation of application No. PCT/CN2019/115485, filed on Nov. 5, 2019.

(30) Foreign Application Priority Data

Jul. 17, 2019 (CN) .......................... 201910646450.0

(51) Int. Cl.
*G01N 3/38* (2006.01)
*G01N 3/24* (2006.01)
(Continued)

(52) U.S. Cl.
CPC .............. *G01N 3/38* (2013.01); *G01N 3/24* (2013.01); *G01N 35/00871* (2013.01); *G01N 2203/0025* (2013.01); *G01N 2203/0647* (2013.01)

(58) Field of Classification Search
CPC ...... G01N 3/38; G01N 3/24; G01N 35/00871; G01N 2203/0025; G01N 2203/0647;
(Continued)

(56) References Cited

U.S. PATENT DOCUMENTS

| | | | |
|---|---|---|---|
| 7,448,279 B2 * | 11/2008 | Brinz ....................... | G01N 3/08 73/842 |
| 2006/0278024 A1 * | 12/2006 | Boncan .................... | G01N 3/08 73/862.627 |
| 2014/0326073 A1 * | 11/2014 | Meadows ................ | G01N 3/08 73/796 |

FOREIGN PATENT DOCUMENTS

| CN | 104048883 A | 9/2014 |
|---|---|---|
| CN | 104535409 A | 4/2015 |

(Continued)

OTHER PUBLICATIONS

International Search Report dated Apr. 15, 2020 in International Application No. PCT/CN2019/115485; 4 pgs.

*Primary Examiner* — Brandi N Hopkins
(74) *Attorney, Agent, or Firm* — Maier & Maier, PLLC

(57) ABSTRACT

A uniaxial bidirectional synchronous control electromagnetic loaded dynamic shear test system and method, a test apparatus thereof including a support platform, a loading bar system, an electromagnetic pulse generation system, a servo-controlled normal pressure loading system, and a data monitoring and acquisition system. The test apparatus can be used to conduct a dynamic shear test research on a rock-like material under a constant normal pressure close to an actual operating condition, and can also be applied to carry out (Continued)

dynamic shear tests on intact rock-like test specimens in various sizes or jointed rock-like test specimens containing a single structural surface to study dynamic shear mechanical property and shear failure behavior under strain rate of $10^1$–$10^3$ $s^{-1}$, thereby providing an important theoretical and technical support for the design, construction, protection, and safety and stability evaluation of geotechnical engineering, structural engineering.

10 Claims, 3 Drawing Sheets

(51) Int. Cl.
  *G01N 29/24* (2006.01)
  *G01N 35/00* (2006.01)

(58) Field of Classification Search
  CPC ........... G01N 3/36; G01N 3/307; G01N 3/02; G01N 3/30; G01N 29/07; G01N 1/286; G01N 3/06; G01N 3/068; Y02A 10/23; G01H 11/06; G01L 25/00
  See application file for complete search history.

(56) References Cited

FOREIGN PATENT DOCUMENTS

| CN | 105973722 A | 9/2016 |
| CN | 106290012 A | 1/2017 |
| CN | 107796711 A | 3/2018 |
| CN | 108519283 A | 9/2018 |

* cited by examiner

UNIAXIAL BIDIRECTIONAL SYNCHRONOUS CONTROL ELECTROMAGNETIC LOADED DYNAMIC SHEAR TEST SYSTEM AND METHOD

CROSS-REFERENCES TO RELATED APPLICATIONS

This application is a Bypass Continuation Application of PCT Patent Application No. PCT/CN2019/115485, filed on Nov. 5, 2019, which claims priority to Chinese Patent Application No. 201910646450.0, filed on Jul. 17, 2019. The content of all aforesaid applications is incorporated herein by reference.

TECHNICAL FIELD

The present disclosure relates to the field of studying dynamic shear mechanical property of solid materials or structural surfaces, and more particularly to a uniaxial bidirectional synchronous control electromagnetic loaded dynamic shear test system and method for studying dynamic shear strength and dynamic shear failure behavior of the structural surfaces or the solid materials such as rock, concrete, polymer.

BACKGROUND

Understanding and mastering the mechanical properties and failure behavior of solid materials especially rock and concrete under shear loading conditions, play an important role in the design, construction, operation, and safety and stability evaluation of modern major civil engineering, e.g., construction engineering, structural engineering, and rock engineering. At present, the mechanical properties and failure behavior of a rock-like material under shear are tested mainly by means of a static or quasi-static load direct shear test with constant normal-pressure or stiffness. In fact, in the field of civil engineering, an engineering structure not only bears the action of a static shear load, but also suffers from a dynamic shear load (such as explosion wave and seismic wave) which results in dynamic shear instability and failure. For example, it is common that a geotechnical slope may become instable and break down under a dynamic shear due to an earthquake, which may lead to the disasters such as landslide, debris flow. Therefore, it is necessary to understand and master the dynamic shear mechanical property and the shear failure behavior of the rock-like material under strain rate of $10^1$–$10^3$ s$^{-1}$. At present, the reports on an apparatus and method for testing the dynamic shear mechanical property and the shear failure behavior of solid materials are very limited. In recent years, based on a one-dimensional Hopkinson pressure bar system, a method using a concentric cylindrical test specimen and a punch shear test specimen to test the dynamic shear strength of rock materials was reported. The method fills the gap of testing the dynamic shear mechanical property of the rock-like material at a high strain rate to a certain extent. However, when the reported method is used to test the dynamic shear mechanical property of the rock-like material, various unavoidable defects and deficiencies are found. For example, it is difficult to ensure the concentricity of two concentric joints cut at the two ends of the concentric cylindrical test specimen by means of drilling, which would be easy to result in a low machining precision and affect a test result. In addition, when a concentric cylindrical test specimen is used to test the dynamic shear strength of the rock material, the shear surface is in the test specimen, and therefore the dynamic shear failure process of the rock cannot be observed in real time by means of a high speed camera. Furthermore, although application of the punch shear test specimen in testing the dynamic shear strength of the rock material can solve the above defect, this method cannot provide a constant normal pressure during shear testing, and therefore the test process has a huge difference from an actual operating condition, which would be easy to result in a large test result. In addition, in the above two methods, the dimension of the rock material is small, generally, the equivalent diameter of the specimen is less than or equal to 50 mm, therefore, it would be difficult to use a large dimensional rock specimen or a rock specimen with a joint to study the dynamic shear mechanical property and the shear failure behavior. Therefore, the prior art still needs to be improved.

SUMMARY

Objective of the present invention: in order to solve the technical problem that the existing experimental apparatus and test method cannot be applied to investigate the dynamic shear mechanical property and the shear failure behavior of a large dimensional (for example, length×width=150 mm×100 mm, which is close to an actual operating condition) rock-like material at high strain rate ($10^1$–$10^3$ s$^{-1}$), the present disclosure provides a uniaxial bidirectional synchronous control electromagnetic loaded dynamic shear test system and method which can effectively overcome the defect in the experimental research on the dynamic shear behavior of rock based on the existing Hopkinson pressure bar. Based on the test apparatus of the present disclosure, dynamic shear test research can be carried out on rock-like material under a constant normal pressure close to an actual operating condition, and dynamic shear tests can also be conducted on intact rock-like specimens in various sizes or jointed rock-like specimens with a single structural surface to study the dynamic shear mechanical property and shear failure behavior under strain rate of $10^1$–$10^3$ s$^{-1}$, thereby providing an important theoretical and technical support for the design, construction, protection, and safety and stability evaluation of geotechnical engineering and structural engineering.

The technical solution of the present invention: a uniaxial bidirectional synchronous control electromagnetic loaded dynamic shear test system, including a support platform, a loading bar system, an electromagnetic pulse generation system, a servo-controlled normal pressure loading system, and a data monitoring and acquisition system.

The support platform provides a basic support platform for the entire test apparatus, and is used to bear the dead weight of the entire apparatus and the impact of dynamic and static loads during testing. The loading bar system includes a left stress wave loading bar and a right stress wave loading bar satisfying different test requirements, made from the same material, and having the same size and machining precision, and is used to transfer and apply a dynamic shear load to a test specimen. The electromagnetic pulse generation system includes a left electromagnetic pulse generator and a right electromagnetic pulse generator made from the same material and having the same model and machining precision, and an electromagnetic pulse generation control system, and is used to provide a dynamic shear pulse load to the test specimen. The servo-controlled normal pressure loading system includes a hydraulic pressure loading cylinder, an actuator, a base, and a normal pressure servo control system, and is used to provide a constant normal pressure for the test specimen. The servo-controlled normal pressure loading system has the functions of programmatically controlling the loading, holding, and unloading of an oil source system, and can ensure that a normal static pressure remains constant during dynamic shear loading process. The data monitoring and acquisition system includes strain gauges, a Wheatstone bridge, a strain signal amplifier, a synchronous multi-channel high-speed recorder, and a computer, and is used to monitor, record and store dynamic shear response data during testing in real time.

In order to solve the problems in the prior art, the present disclosure provides a uniaxial bidirectional synchronous control electromagnetic loaded dynamic shear test system, including a support platform, a left electromagnetic pulse generator, a left electromagnetic pulse generator support, a left stress wave loading bar, a stress wave loading bar support, a right electromagnetic pulse generator, a right electromagnetic pulse generator support, a right stress wave loading bar, a bottom plate, a top plate, a support post, a hydraulic pressure loading apparatus, an actuator, a base, a test specimen, strain gauges, wherein a test apparatus centers on the test specimen and is arranged on left and right sides of the test specimen; a left dynamic shear loading apparatus comprises a left electromagnetic pulse generator, a left electromagnetic pulse generator support, a left stress wave loading bar, and a stress wave loading bar support, wherein the left electromagnetic pulse generator is placed on the left electromagnetic pulse generator support; the left electromagnetic pulse generator and the left electromagnetic pulse generator support can axially move on the support platform along the axis of the loading bar, and can be fixed at a position satisfying a test requirement; the left stress wave loading bar is horizontally placed in a fastening groove of the stress wave loading bar support, and can freely slide left and right in the support fastening groove; the incident end of the left stress wave loading bar freely contacts the right stress wave output end surface of the left electromagnetic pulse generator, so as to transmit a stress wave to the left stress wave loading bar; then, the stress wave propagates towards the test specimen in the axial direction of the bar, and applies a dynamic shear load to the test specimen from left to right;

a right dynamic shear loading apparatus includes a right electromagnetic pulse generator, a right electromagnetic pulse generator support, a right stress wave loading bar, and a stress wave loading bar support, wherein the right electromagnetic pulse generator is placed on the right electromagnetic pulse generator support; the right electromagnetic pulse generator and the right electromagnetic pulse generator support can axially move on the support platform along the axis of the loading bar, and can be fixed at a position satisfying a test requirement; the right stress wave loading bar is horizontally placed in a fastening groove of the stress wave loading bar support, and can freely slide left and right in the support fastening groove; the incident end of the right stress wave loading bar freely contacts the left stress wave output end surface of the right electromagnetic pulse generator, so as to transmit a stress wave to the right stress wave loading bar; then, the stress wave propagates towards the test specimen in the axial direction of the bar, and applies a dynamic shear load to the test specimen from right to left;

a servo-controlled normal pressure loading system includes a bottom plate, a top plate, a support post, a hydraulic pressure loading apparatus, an actuator, and a base, wherein the bottom plate and the top plate are connected by means of the support post to form a loading frame system of the servo-controlled normal pressure loading apparatus; the hydraulic pressure loading apparatus is fixed on the top plate; the actuator is connected to the hydraulic pressure loading apparatus, and is used to transfer an oil pressure provided by the hydraulic pressure loading apparatus to the upper surface of the test specimen; the base is located on the bottom plate, and is used to place the test specimen; the base and the actuator together form an action-and-reaction structure, and apply a static normal pressure to the lower surface and the upper surface of the test specimen, respectively; and the strain gauges are adhered in the centers of upper surfaces and lower surfaces of the left stress wave loading bar and the right stress wave loading bar, respectively.

As a further improvement of the present disclosure, the test system further includes a signal amplifier, a data recorder, and a computer; during a dynamic shear test, the strain gauges transmit strain signals monitored on the left stress wave loading bar and the right stress wave loading bar to the signal amplifier by means of shielded conductors and a Wheatstone bridge, respectively; the strain signals are amplified by the signal amplifier, and are then outputted, by means of the shielded conductors, to the data recorder for recording and storage; and finally, the data recorder outputs, by means of a data wire, strain signal data to the computer for analysis and processing.

As a further improvement of the present disclosure, the bottom plate and the top plate are connected by means of four cylindrical support posts to form the loading frame system of the servo-controlled normal pressure loading apparatus.

As a further improvement of the present disclosure, the hydraulic pressure loading apparatus is fixed in the center of the top plate, and the base is located in the center of the bottom plate.

As a further improvement of the present disclosure, the strain gauges are adhered in the centers of upper surfaces and lower surfaces of the left stress wave loading bar and the right stress wave loading bar, respectively.

A uniaxial bidirectional synchronous control electromagnetic loaded dynamic shear test method, using the above test apparatus to conduct the following operations:

placing a machined and ground test specimen on a base, horizontally placing the left stress wave loading bar in a fastening groove of a loading bar support, and ensuring that the left stress wave loading bar can freely slide left and right in the fastening groove; then, aligning and closely attaching the right loading end surface of the left stress wave loading bar with/to a lower section of a dynamic shear loading surface on the left of the test specimen; meanwhile, placing the left electromagnetic pulse generator on the left electromagnetic pulse generator support, and adjusting the two to an end of the left stress wave loading bar, such that the right stress wave output end surface of the left electromagnetic pulse generator aligns with and is closely attached to the incident stress wave loading end surface of the left stress wave loading bar;

horizontally placing the right stress wave loading bar in a fastening groove of a loading bar support, and ensuring that the right stress wave loading bar can freely slide left and right in the fastening groove; then, aligning and closely attaching the left loading end surface of the right stress wave loading bar with/to an upper section of a dynamic shear loading surface on the right side of the test specimen; meanwhile, placing the right electromagnetic pulse generator on the right electromagnetic pulse generator support, and adjusting the two to the end of the right stress wave loading bar, such that the left stress wave output end surface of the right electromagnetic pulse generator aligns with and is closely attached to the incident stress wave loading end surface of the right stress wave loading bar;

setting a normal pressure value according to test requirements; adjusting, by means of a servo-controlled normal hydraulic pressure loading system, a normal static pressure applied to the upper surface of the test specimen by a hydraulic pressure loading apparatus driving actuator according to a preset loading rate; when the normal pressure reaches a preset value and remains stable, operating the electromagnetic pulse generation control system to drive the left electromagnetic pulse generator and the right electromagnetic pulse generator to synchronously generate and output incident stress waves with a targeted amplitude and a duration according to test requirements, wherein the incident stress waves propagate towards the test specimen along the left and the right stress wave loading bars, so as to apply a dynamic shear load to the test specimen;

during loading, monitoring the incident strain signals and reflected strain signals in the bars by means of strain gauges adhered to the left and the right loading bars in real time, wherein when strain signal data monitored by the strain gauges shows that the dynamic shear loads applied to the left and the right end surfaces of the test specimen with a single joint during dynamic shear loading are basically consistent, the dynamic shear process of the granite specimen with a single joint is considered to reach a stress balance state; according to one-dimensional strain wave propagation theory, the dynamic shear strength $\tau(t)$ of the test specimen under a normal pressure can be calculated with the strain data monitored by the strain gauges using the following formula:

$$\tau(t) = \frac{EA}{2A_s}(\varepsilon_{left\ incident} + \varepsilon_{right\ incident} + \varepsilon_{left\ reflected} + \varepsilon_{right\ reflected})$$

wherein E and A are an elastic modulus and a cross section area of the stress wave loading bar, respectively; $A_s$ is an area of a shear surface of the test specimen; $\varepsilon_{left\ incident}$ and $\varepsilon_{left\ reflected}$ are the incident strain signal and the reflected strain signal monitored on the left stress wave loading bar by the strain gauge, respectively; and $\varepsilon_{right\ incident}$ and $\varepsilon_{right\ reflected}$ are the incident strain signal and the reflected strain signal monitored on the right stress wave loading bar by the strain gauge, respectively.

As a further improvement of the present disclosure, during dynamic shear loading, the normal static pressure remains relatively constant and unchanged under the regulation and control of the servo-controlled normal hydraulic pressure loading system, so as to achieve a dynamic shear loading test under a relatively constant normal pressure.

As a further improvement of the present disclosure, the test specimen is placed in the center of a surface of the base.

As a further improvement of the present disclosure, during dynamic shear loading, an ultra-high-speed camera is used to photograph in real time, at the rate of 100-1000 thousand frames per second, the dynamic shear failure process of the jointed surface from one side of the shear surface of the test specimen, and the obtained images are used to analyze the dynamic shear failure behavior of the test specimen.

As a further improvement of the present disclosure, during loading, the incident strain signals and the reflected strain signals in the bars are monitored in real time by means of the strain gauges adhered to the centers of the left and the right loading bars, and are transmitted to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing.

The beneficial effects of the present disclosure are:

In the uniaxial bidirectional synchronous control electromagnetic loaded dynamic shear test system, the stress wave loading bar is a bar with a rectangular section; the stress wave loading bars in various sizes are provided to conduct dynamic shear tests on intact rock-like specimens in various sizes or rock-like jointed specimens with a single joint, thereby overcoming the defect that the existing apparatus cannot be used to study the dynamic shear mechanical property and the shear failure behavior of large dimensional rock-like specimens.

In the uniaxial bidirectional synchronous control electromagnetic loaded dynamic shear test system, the electromagnetic pulse stress wave generation system can be precisely controlled to repeatedly generate incident stress waves with different amplitudes and durations, thereby solving the problem that the dynamic shear test based on the conventional Hopkinson pressure bar apparatus is difficult to be precisely controlled to repeatedly generate incident stress waves; furthermore, the electromagnetic pulse generators in two directions synchronously generate and load the incident stress waves; the loads applied to the two ends of the test specimen are ensured to be equal during dynamic shear loading, and the time for a specimen to reach a dynamic shear stress balance state is greatly reduced during dynamic shear testing, thereby having a more reliable test result.

In the uniaxial bidirectional synchronous control electromagnetic loaded dynamic shear test system and method, the test specimen has a rectangular or a cubic shape, and can be an intact rock-like specimen or a rock-like jointed specimen with a single joint; during dynamic shear loading, the front and back surfaces (equivalent to shear surfaces) of the test specimen are free faces, and a high-speed camera can be used to photograph in real time the dynamic shear crack initiation, propagation and penetration process from one side of the shear surface, thereby overcoming the defect that the use of the conventional concentric cylindrical test specimen cannot monitor the shear crack propagation behavior.

In the uniaxial bidirectional synchronous control electromagnetic loaded dynamic shear test system and method, the servo-controlled normal pressure loading system can apply normal static pressure via a servo-controlled mode, and can conduct dynamic shear tests under relatively stable normal stress in case that the normal stresses are different, thereby overcoming the defect that the existing dynamic shear apparatus cannot be used to conduct dynamic shear tests with constant normal stresses, and enabling the research on the dynamic shear test of a rock-like specimen to be closer to the actual operating condition.

Reference signs corresponding to the components in the figures are as follows:

1, support platform; 2, left electromagnetic pulse generator; 3, left electromagnetic pulse generator support; 4, left stress wave loading bar; 5, stress wave loading bar support; 6, right electromagnetic pulse generator; 7, right electromagnetic pulse generator support; 8, right stress wave loading bar; 9, bottom plate; 10, top plate; 11, support post; 12, hydraulic pressure loading apparatus; 13, actuator; 14, base; 15, test specimen; and 16, strain gauge.

DETAILED DESCRIPTION OF THE EMBODIMENTS

The present disclosure will be further described hereafter with reference to the accompanying drawings.

Figure 1:
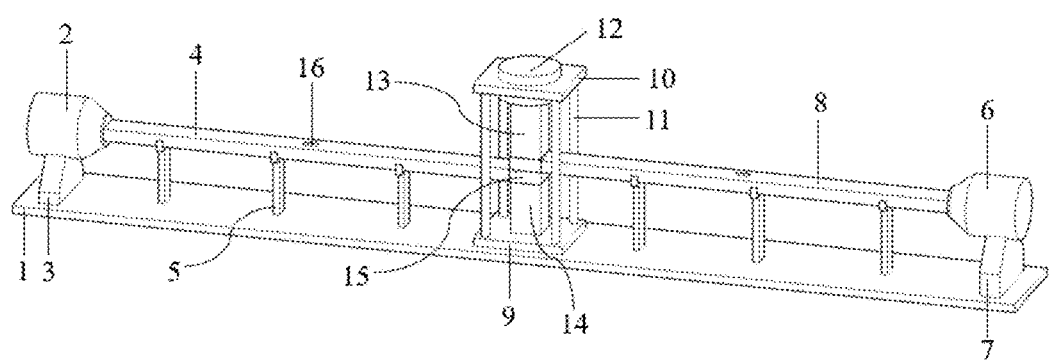
FIG. 1 is a three-dimensional view of a uniaxial bidirectional synchronous control electromagnetic loaded dynamic shear test system.
Figure 2:
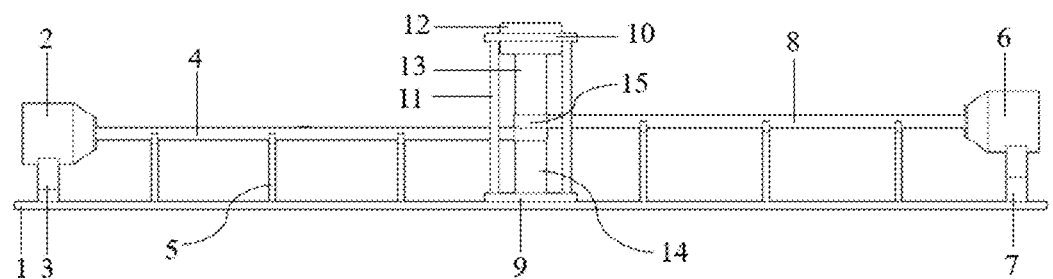
FIG. 2 is a front view of the uniaxial bidirectional synchronous control electromagnetic loaded dynamic shear test system.

In one embodiment of the present disclosure, FIG. 1 is a three-dimensional view of a uniaxial bidirectional synchronous control electromagnetic loaded dynamic shear test system. As shown in the figure, the uniaxial bidirectional synchronous control electromagnetic loaded dynamic shear test system includes a support platform, a loading bar system, an electromagnetic pulse generation system, a servo-controlled normal pressure loading system, and a data monitoring and acquisition system. A test apparatus centers on the test specimen 15 and is arranged on left and right sides of the test specimen; a left dynamic shear loading apparatus includes a left electromagnetic pulse generator 2, a left electromagnetic pulse generator support 3, a left stress wave loading bar 4, and a stress wave loading bar support 5, wherein the left electromagnetic pulse generator 2 is placed on the left electromagnetic pulse generator support 3; the left electromagnetic pulse generator 2 and the left electromagnetic pulse generator support 3 can axially move on the support platform 1 along the axis of the loading bar, and can be fixed at a position satisfying a test requirement; the left stress wave loading bar 4 is horizontally placed in a fastening groove of the stress wave loading bar support 5, and can freely slide left and right in the support fastening groove; an incident end (equivalent to a left end surface of the bar) of the left stress wave loading bar 4 freely contacts a right stress wave output end surface of the left electromagnetic pulse generator 2, so as to transmit a stress wave to the left stress wave loading bar; then, the stress wave propagates towards the test specimen in the axial direction of the bar, and applies a dynamic shear load to the test specimen from left to right.

a right dynamic shear loading apparatus includes a right electromagnetic pulse generator 6, a right electromagnetic pulse generator support 7, a right stress wave loading bar 8, and a stress wave loading bar support 5, wherein the right electromagnetic pulse generator 6 is placed on the right electromagnetic pulse generator support 7; the right electromagnetic pulse generator 6 and the right electromagnetic pulse generator support 7 can axially move on the support platform 1 along the axis of the loading bar, and can be fixed at a position satisfying a test requirement; the right stress wave loading bar 8 is horizontally placed in a fastening groove of the stress wave loading bar support 5, and can freely slide left and right in the support fastening groove; an incident end (equivalent to a right end surface of the bar) of the right stress wave loading bar 8 freely contacts a left stress wave output end surface of the right electromagnetic pulse generator 6, so as to transmit a stress wave to the right stress wave loading bar; then, the stress wave propagates towards the test specimen in the axial direction of the bar, and applies a dynamic shear load to the test specimen from right to left.

A servo-controlled normal pressure loading system includes a bottom plate 9, a top plate 10, a support post 11, a hydraulic pressure loading apparatus 12, an actuator 13, and a base 14, wherein the bottom plate 9 and the top plate 10 are connected by means of four cylindrical support posts 11 to form a loading frame system of a servo-controlled normal pressure loading apparatus; the hydraulic pressure loading apparatus 12 is fixed in the center of the top plate 10, and the two are welded to form an integrated structure; the actuator 13 is connected to the hydraulic pressure loading apparatus 12, and is used to transfer an oil pressure provided by the hydraulic pressure loading apparatus to the upper surface of the test specimen 15; the base 14 is located in the center of the bottom plate 9, and is used to place the test specimen 15; the base and the actuator 13 together form an action-and-reaction structure, and apply a static normal pressure to the lower surface and the upper surface of the test specimen 15, respectively.

The data monitoring and acquisition system includes strain gauges 16 (for example, a resistance strain gauge), a signal amplifier, a data recorder, and a computer, wherein the strain gauges 16 are adhered in the centers of upper surfaces and lower surfaces of the left stress wave loading bar 4 and the right stress wave loading bar 8, respectively; during a dynamic shear test, the strain gauges 16 transmit strain signals respectively monitored on the left stress wave loading bar 4 and the right stress wave loading bar 8 to the signal amplifier by means of shielded conductors and Wheatstone bridges; the strain signals are amplified by the signal amplifier, and are then outputted, by means of the shielded conductors, to the data recorder for recording and storage; and finally, the data recorder outputs, by means of a data wire, strain signal data to the computer for analysis and processing.

Figure 3:
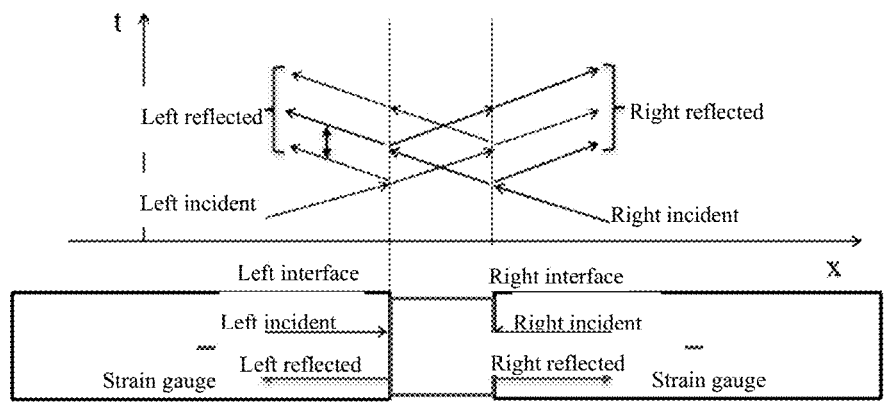
FIG. 3 is a schematic view showing how a stress wave travels in the uniaxial bidirectional synchronous control electromagnetic loaded dynamic shear test system.
Figure 4:
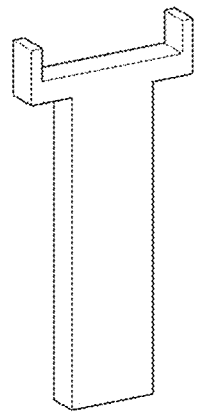
FIG. 4 is a three-dimensional view of a stress wave loading bar support.
Figure 5:
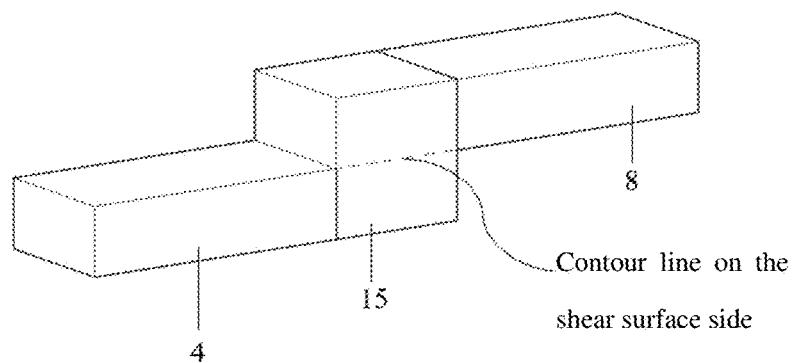
FIG. 5 is a three-dimensional view showing how a stress wave loading bar contacts an intact sheared test specimen loading end surface.
Figure 6:
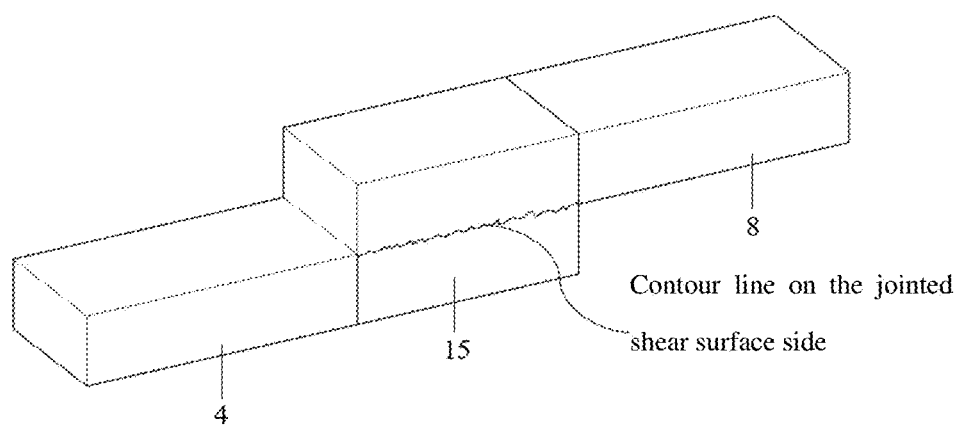
FIG. 6 is a three-dimensional view showing how the stress wave loading bar contacts a loading end surface of a sheared test specimen with a single joint.

According to one-dimensional strain wave propagation theory, when the data monitored by the strain gauges 16 shows that the dynamic shear loads applied to the left and the right end surfaces of the test specimen during dynamic shear loading are basically consistent, the test specimen is considered to reach a stress balance state during dynamic shear loading process; therefore, the dynamic shear strength $\tau(t)$ of a rock-like material under a normal pressure in accordance with the test requirement can be calculated with the strain data monitored by the strain gauges 16 using the following formula:

$$\tau(t) = \frac{EA}{2A_s}(\varepsilon_{left\ incident} + \varepsilon_{right\ incident} + \varepsilon_{left\ reflected} + \varepsilon_{right\ reflected})$$

wherein E and A are an elastic modulus and a cross section area of the stress wave loading bar, respectively; $A_s$ is an area of a shear surface of the test specimen; $\varepsilon_{left\ incident}$ and $\varepsilon_{left\ reflected}$ are the incident strain signal and the reflected strain signal monitored on the left stress wave loading bar by the strain gauge, respectively; and $\varepsilon_{right\ incident}$ and $\varepsilon_{right\ reflected}$ are the incident strain signal and the reflected strain signal monitored on the right stress wave loading bar by the strain gauge, respectively, wherein the schematic view of how a stress wave travels in the uniaxial bidirectional synchronous control electromagnetic loaded dynamic shear test system is as shown in FIG. 3.

In one embodiment of the present disclosure, a machined and ground cubic red sandstone (equivalent to the test specimen 15) with both length, width and height of 100 mm is placed in the center of the surface of the base 14; the left stress wave loading bar 4, which is 2 m in length, 100 mm in width and 50 mm in height and made from TC21 titanium alloy, is horizontally placed in the fastening groove of the loading bar support 5, ensuring that the left stress wave loading bar 4 can freely slide left and right in the fastening groove; then, the right loading end surface of the left stress wave loading bar 4 aligns with and is closely attached to the lower section of the dynamic shear loading surface on the left of the cubic red sandstone (that is the test specimen 15); meanwhile, the left electromagnetic pulse generator 2 is placed on the left electromagnetic pulse generator support 3, and the two are adjusted to the end of the left stress wave loading bar 4, such that the right stress wave output end surface of the left electromagnetic pulse generator 2 aligns with and is closely attached to the incident stress wave loading end surface of the left stress wave loading bar 4; similarly, the right stress wave loading bar 8 which is 2 m in length, 100 mm in width and 50 mm in height and made from TC21 titanium alloy is horizontally placed in the fastening groove of the stress wave loading bar support 5, ensuring that the right stress wave loading bar 8 can freely slide left and right in the fastening groove; then, the left loading end surface of the right stress wave loading bar 8 aligns with and is closely attached to the upper section of the dynamic shear loading surface on the right of the cubic red sandstone (equivalent to the test specimen 15); meanwhile, the right electromagnetic pulse generator 6 is placed on the right electromagnetic pulse generator support 7, and the two to are adjusted the end of the right stress wave loading bar 8, such that the left stress wave output end surface of the right electromagnetic pulse generator 6 aligns with and is closely attached to the incident stress wave loading end surface of the right stress wave loading bar 8; subsequently, a normal pressure value (for example, 5 MPa) is set according to test requirement; a servo-controlled normal hydraulic pressure loading system adjusts a normal static pressure applied to the upper surface of the test specimen 15 by a hydraulic pressure loading apparatus 12 driving actuator 13 according to a preset loading rate; when the normal pressure reaches the preset value and remains stable, an electromagnetic pulse generation control system is operated to drive the left electromagnetic pulse generator 2 and the right electromagnetic pulse generator 6 to synchronously generate and output incident stress waves with a targeted amplitude (for example, 200 MPa) and a duration (for example, 400 μs) according to test requirements; then, the incident stress waves propagate towards the cubic red sandstone (that is the test specimen 15) along the left and the right stress wave loading bars, so as to load a dynamic shear to the cubic red sandstone; It should be noted that during dynamic shear loading, the normal static pressure remains constant and unchanged under the regulation and control of the servo-controlled normal hydraulic pressure loading system, so as to achieve a dynamic shear loading test under a constant normal pressure; and during loading, the incident strain signals and the reflected strain signals in the bars are monitored in real time by means of the strain gauges 16 adhered to the centers of the left and the right stress wave loading bars, and are transmitted to a signal amplifier by means of the shielded conductors and the Wheatstone bridges; the strain signals are amplified by the signal amplifier, and are then outputted, by means of the shielded conductors, to the data recorder for recording and storage; and finally, the data recorder outputs, by means of the data wire, strain signal data to the computer for analysis and processing. In addition, during dynamic shear loading, an ultra-high-speed camera (for example, Kirana 05M ultra-high-speed camera) is used to photograph, at the rate of 100 thousand to 1 million frames per second, the dynamic shear crack initiation, propagation, and coalescent process from one side of the shear surface of the cubic red sandstone (that is the test specimen 15) in real time, and the obtained images are used to analyze the dynamic shear failure behavior of the red sandstone. When the strain signal data monitored by the strain gauges 16 shows that the dynamic shear loads applied to the left and the right end surfaces of the cubic red sandstone (that is the test specimen 15) during dynamic shear loading are basically consistent, the cubic red sandstone is then considered to reach a stress balance state during dynamic shear loading process. According to the one-dimensional strain wave propagation theory, the dynamic shear strength τ(t) of the red sandstone material under a normal pressure (for example, 5 MPa) set in accordance with the test requirement can be calculated with the strain data monitored by the strain gauges 16 using the following formula:

$$\tau(t) = \frac{EA}{2A_s}(\varepsilon_{left\ incident} + \varepsilon_{right\ incident} + \varepsilon_{left\ reflected} + \varepsilon_{right\ reflected})$$

wherein E and A are an elastic modulus (107.8 GPa) and a cross section area (5000 mm$^2$) of the stress wave loading bar, respectively; $A_s$ is an area (10000 mm$^2$, the side length of the red sandstone specimen is 100 mm) of a shear surface of the test specimen; $\varepsilon_{left\ incident}$ and $\varepsilon_{left\ reflected}$ are the incident strain signal and the reflected strain signal monitored on the left stress wave loading bar by the strain gauge, respectively; and $\varepsilon_{right\ incident}$ and $\varepsilon_{right\ reflected}$ are the incident strain signal and the reflected strain signal monitored on the right stress wave loading bar by the strain gauge, respectively.

In one embodiment of the present disclosure, a machined and ground granite specimen with a single joint (that is the test specimen 15) which is 200 mm in length, 100 mm in width and 100 mm in height is placed in the center of a surface of the base 14; the left stress wave loading bar 4 which is 2 m in length, 100 mm in width and 50 mm in height and made from TC21 titanium alloy is horizontally placed in the fastening groove of the loading bar support 5, ensuring that the left stress wave loading bar 4 can freely slide left and right in the fastening groove; then, the right loading end surface of the left stress wave loading bar 4 aligns with and is closely attached to the lower section of the dynamic shear loading surface on the left of the granite specimen with a single joint (that is the test specimen 15); meanwhile, the left electromagnetic pulse generator 2 is placed on the left electromagnetic pulse generator support 3, and the two are adjusted to an end of the left stress wave loading bar 4, such that the right stress wave output end surface of the left electromagnetic pulse generator 2 aligns with and is closely attached to the incident stress wave loading end surface of the left stress wave loading bar 4; similarly, the right stress wave loading bar 8 which is 2 m in length, 100 mm in width and 50 mm in height and made from TC21 titanium alloy is horizontally placed in the fastening groove of the stress wave loading bar support 5, ensuring that the right stress wave loading bar 8 can freely slide left and right in the fastening groove; then, the left loading end surface of the right stress wave loading bar 8 aligns with and is closely attached to the upper section of the dynamic shear loading surface on the right of the granite specimen with a single joint (that is the test specimen 15); meanwhile, the right electromagnetic pulse generator 6 is placed on the right electromagnetic pulse generator support 7, and the two are adjusted to an end of the right stress wave loading bar 8, such that the left stress wave output end surface of the right electromagnetic pulse generator 6 aligns with and is closely attached to the incident stress wave loading end surface of the right stress wave loading bar 8; subsequently, a normal pressure value (for example, 10 MPa) is set according to test requirement; a servo-controlled normal hydraulic pressure loading system adjusts a normal static pressure applied to the upper surface of the granite specimen with a single joint (that is the test specimen 15) by a hydraulic pressure loading apparatus 12 driving actuator 13 according to a preset loading rate; when the normal pressure reaches a preset value and remains stable, an electromagnetic pulse generation control system is operated to drive the left electromagnetic pulse generator 2 and the right electromagnetic pulse generator 6 to synchronously generate and output incident stress waves with a targeted amplitude (for example, 300 MPa) and a duration (for example, 200 μs) according to test requirements; then, the incident stress waves propagate towards the granite specimen with a single joint (that is the test specimen 15) along the left and the right loading bars, so as to apply dynamic shear load to the cubic red sandstone. It should be noted that during dynamic shear loading, the normal static pressure remains constant and unchanged under the regulation and control of the servo-controlled normal hydraulic pressure loading system, so as to achieve a dynamic shear loading test under a constant normal pressure; and during loading, the incident strain signals and the reflected strain signals in the stress wave loading bars are monitored in real time by means of the strain gauges 16 adhered to the centers of the left and the right stress wave loading bars, and are transmitted to a signal amplifier by means of the shielded conductors and the Wheatstone bridges; the strain signals are amplified by the signal amplifier, and are then outputted, by means of the shielded conductors, to the data recorder for recording and storage; and finally, the data recorder outputs, by means of the data wire, strain signal data to the computer for analysis and processing. In addition, during dynamic shear loading, an ultra-high-speed camera (for example, Kirana 05M ultra-high-speed camera) is used to photograph, at the rate of 100 thousand to 1 million frames per second, the dynamic shear failure process of the jointed surface from one side of the shear surface of the granite specimen with a single joint (that is the test specimen 15) in real time, and the obtained images are used to analyze the dynamic shear failure behavior of the granite specimen with a single joint. When the strain signal data monitored by the strain gauges 16 shows that the dynamic shear loads applied to the left and the right end surfaces of the granite specimen with a single joint (that is the test specimen 15) during dynamic shear loading are basically consistent, the granite specimen with a single joint is considered to reach a stress balance state during the dynamic shear loading process. According to the one-dimensional strain wave propagation theory, the dynamic shear strength τ(t) of the granite specimen with a single joint under a normal pressure (for example, 10 MPa) set according to test requirement can be calculated with strain data monitored by the strain gauges 16 using the following formula:

$$\tau(t) = \frac{EA}{2A_s}(\varepsilon_{left\ incident} + \varepsilon_{right\ incident} + \varepsilon_{left\ reflected} + \varepsilon_{right\ reflected})$$

wherein E and A are an elastic modulus (107.8 GPa) and a cross section area (5000 mm$^2$) of the stress wave loading bar, respectively; $A_s$ is an area (10000 mm$^2$, the shear surface the granite specimen with a single joint is 200 mm in length and 100 mm in width) of a shear surface of the test specimen; $\varepsilon_{left\ incident}$ and $\varepsilon_{left\ reflected}$ are the incident strain signal and the reflected strain signal monitored on the left stress wave loading bar by the strain gauge, respectively; and $\varepsilon_{right\ incident}$ and $\varepsilon_{right\ reflected}$ are the incident strain signal and the reflected strain signal monitored on the right stress wave loading bar by the strain gauge, respectively.

The present disclosure is described in detail above with reference to specific preferred embodiments. However, the specific embodiments of the present disclosure are not considered to be limited by the descriptions only. For a person skilled in the art, any simple deductions or substitutions made without departing from the concept of the present disclosure should be all concluded in the protection scope of the present disclosure.

What is claimed is:

1. A uniaxial bidirectional synchronous control electromagnetic loaded dynamic shear test system,
    comprising a support platform, a left electromagnetic pulse generator, a left electromagnetic pulse generator support, a left stress wave loading bar, a stress wave loading bar support, a right electromagnetic pulse generator, a right electromagnetic pulse generator support, a right stress wave loading bar, a bottom plate, a top plate, a support post, a hydraulic pressure loading apparatus, an actuator, a base, a test specimen, and strain gauges, wherein
    a test apparatus centers on the test specimen and is arranged on left and right sides of the test specimen; a left dynamic shear loading apparatus comprises a left electromagnetic pulse generator, a left electromagnetic pulse generator support, a left stress wave loading bar, and a stress wave loading bar support, wherein the left electromagnetic pulse generator is placed on the left electromagnetic pulse generator support; the left electromagnetic pulse generator and the left electromagnetic pulse generator support can axially move on the support platform along an axis of the loading bar, and can be fixed at a position satisfying a test requirement; the left stress wave loading bar is horizontally placed in a fastening groove of the stress wave loading bar support, and can freely slide left and right in the support fastening groove; an incident end of the left stress wave loading bar freely contacts a right stress wave output end surface of the left electromagnetic pulse generator, so as to transmit a stress wave to the left stress wave loading bar; then, the stress wave propagates towards the test specimen in the axial direction of the bar, and applies a dynamic shear load to the test specimen from left to right;

a right dynamic shear loading apparatus comprises a right electromagnetic pulse generator, a right electromagnetic pulse generator support, a right stress wave loading bar, and a stress wave loading bar support, wherein the right electromagnetic pulse generator is placed on the right electromagnetic pulse generator support; the right electromagnetic pulse generator and the right electromagnetic pulse generator support can axially move on the support platform along an axis of the loading bar, and can be fixed at a position satisfying a test requirement; the right stress wave loading bar is horizontally placed in a fastening groove of the stress wave loading bar support, and can freely slide left and right in the support fastening groove; an incident end of the right stress wave loading bar freely contacts a left stress wave output end surface of the right electromagnetic pulse generator, so as to transmit a stress wave to the right stress wave loading bar; then, the stress wave propagates towards the test specimen in the axial direction of the bar, and applies a dynamic shear load to the test specimen from right to left;

a servo-controlled normal pressure loading system comprises a bottom plate, a top plate, a support post, a hydraulic pressure loading apparatus, an actuator, and a base, wherein the bottom plate and the top plate are connected by means of the support post to form a loading frame system of a servo-controlled normal pressure loading apparatus; the hydraulic pressure loading apparatus is fixed on the top plate; the actuator is connected to the hydraulic pressure loading apparatus, and is used to transfer an oil pressure provided by the hydraulic pressure loading apparatus to an upper surface of the test specimen; the base is located on the bottom plate, and is used to place the test specimen; the base and the actuator together form an action-and-reaction structure, and apply a static normal pressure to a lower surface and the upper surface of the test specimen, respectively; and the strain gauges are adhered in the centers of upper surfaces and lower surfaces of the left stress wave loading bar and the right stress wave loading bar, respectively.

2. The uniaxial bidirectional synchronous control electromagnetic loaded dynamic shear test system according to claim 1, wherein the test system further comprises a signal amplifier, a data recorder, and a computer; during a dynamic shear test, the strain gauges transmit strain signals respectively monitored on the left stress wave loading bar and the right stress wave loading bar to the signal amplifier by means of shielded conductors and Wheatstone bridges; the strain signals are amplified by the signal amplifier, and are then outputted, by means of the shielded conductors, to the data recorder for recording and storage; and finally, the data recorder outputs, by means of a data wire, strain signal data to the computer for analysis and processing.

3. The uniaxial bidirectional synchronous control electromagnetic loaded dynamic shear test system according to claim 1, wherein the bottom plate and the top plate are connected by means of four cylindrical support posts to form the loading frame system of the servo-controlled normal pressure loading apparatus.

4. The uniaxial bidirectional synchronous control electromagnetic loaded dynamic shear test system according to claim 1, wherein the hydraulic pressure loading apparatus is fixed in the center of the top plate, and the base is located in the center of the bottom plate.

5. The uniaxial bidirectional synchronous control electromagnetic loaded dynamic shear test system according to claim 1, wherein the strain gauges are adhered in the centers of upper surfaces and lower surfaces of the left stress wave loading bar and the right stress wave loading bar, respectively.

6. A uniaxial bidirectional synchronous control electromagnetic loaded dynamic shear test method, using the test apparatus as claimed in claim 1 to conduct the following operations:

placing a machined and ground test specimen on a base, horizontally placing a left stress wave loading bar in a fastening groove of a loading bar support, and ensuring that the left stress wave loading bar can freely slide left and right in the fastening groove; then, aligning and closely attaching a right loading end surface of the left stress wave loading bar with/to a lower section of a dynamic shear loading surface on the left of the test specimen; meanwhile, placing a left electromagnetic pulse generator on a left electromagnetic pulse generator support, and adjusting the two to an end of the left stress wave loading bar, such that a right stress wave output end surface of the left electromagnetic pulse generator aligns with and is closely attached to an incident stress wave loading end surface of the left stress wave loading bar;

horizontally placing a right stress wave loading bar in a fastening groove of a loading bar support, and ensuring that the right stress wave loading bar can freely slide left and right in the fastening groove; then, aligning and closely attaching a left loading end surface of the right stress wave loading bar with/to an upper section of a dynamic shear loading surface on the right side of the test specimen; meanwhile, placing a right electromagnetic pulse generator on a right electromagnetic pulse generator support, and adjusting the two to an end of the right stress wave loading bar, such that a left stress wave output end surface of the right electromagnetic pulse generator aligns with and is closely attached to an incident stress wave loading end surface of the right stress wave loading bar;

setting a normal pressure value according to test requirements; adjusting, by means of a servo-controlled normal hydraulic pressure loading system, a normal static pressure applied to an upper surface of the test specimen by a hydraulic pressure loading apparatus driving actuator according to a preset loading rate; when the normal pressure reaches a preset value and then remains stable, operating an electromagnetic pulse generation control system to drive the left electromagnetic pulse generator and the right electromagnetic pulse generator to synchronously generate and output incident stress waves with an amplitude and a duration according to test requirements, wherein the incident stress waves propagate towards the test specimen along the left and the right stress wave loading bars, so as to apply a dynamic shear load to the test specimen;

during loading, monitoring incident strain signals and reflected strain signals in the bars by means of strain gauges adhered to the left and the right stress wave loading bars in real time, wherein when strain signal data monitored by the strain gauges shows that the dynamic shear loads applied to the left and the right end surfaces of the test specimen with a single joint during dynamic shear loading are basically consistent, the granite specimen with a single joint is considered to reach a stress balance state during the dynamic shear loading process; according to one-dimensional strain wave propagation theory, the dynamic shear strength $\tau(t)$ of the test specimen under a normal pressure set according to test requirement can be calculated with strain data monitored by the strain gauges using the following formula:

$$\tau(t) = \frac{EA}{2A_s}(\varepsilon_{left\ incident} + \varepsilon_{right\ incident} + \varepsilon_{left\ reflected} + \varepsilon_{right\ reflected})$$

wherein E and A are an elastic modulus and a cross section area of the stress wave loading bar, respectively; $A_s$ is an area of a shear surface of the test specimen; $\varepsilon_{left\ incident}$ and $\varepsilon_{left\ reflected}$ are the incident strain signal and the reflected strain signal monitored on the left stress wave loading bar by the strain gauge, respectively; and $\varepsilon_{right\ incident}$ and $\varepsilon_{right\ reflected}$ are the incident strain signal and the reflected strain signal monitored on the right stress wave loading bar by the strain gauge, respectively.

7. The uniaxial bidirectional synchronous control electromagnetic loaded dynamic shear test method according to claim 6, wherein during dynamic shear loading, the normal static pressure remains relatively constant and unchanged under the regulation and control of the servo-controlled normal hydraulic pressure loading system, so as to achieve a dynamic shear loading test under a relatively constant normal pressure.

8. The uniaxial bidirectional synchronous control electromagnetic loaded dynamic shear test method according to claim 6, wherein the test specimen is placed in the center of a surface of the base.

9. The uniaxial bidirectional synchronous control electromagnetic loaded dynamic shear test method according to claim 6, wherein during dynamic shear loading, an ultra-high-speed camera is used to photograph in real time, at the rate of 100 thousand to 1 million frames per second, a dynamic shear failure process of the joint from one side of the shear surface of the test specimen, and the obtained images are used to analyze a dynamic shear failure behavior of the test specimen.

10. The uniaxial bidirectional synchronous control electromagnetic loaded dynamic shear test method according to claim 6, wherein during loading, the incident strain signals and the reflected strain signals in the bars are monitored in real time by means of the strain gauges adhered to the centers of the left and the right loading bars, and are transmitted to a signal amplifier by means of shielded conductors and Wheatstone bridges; the strain signals are amplified by the signal amplifier, and are then outputted, by means of the shielded conductors, to a data recorder for recording and storage; and finally, the data recorder outputs, by means of a data wire, strain signal data to a computer for analysis and processing.

\* \* \* \* \*